(12) United States Patent
Berry et al.

(10) Patent No.: US 10,352,571 B2
(45) Date of Patent: Jul. 16, 2019

(54) CATALYTIC IGNITION SYSTEM

(71) Applicant: General Electric Company, Schenectady, NY (US)

(72) Inventors: Jonathan Dwight Berry, Simpsonville, SC (US); Gregory Scott Means, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 298 days.

(21) Appl. No.: 14/996,287

(22) Filed: Jan. 15, 2016

(65) Prior Publication Data

US 2017/0205071 A1 Jul. 20, 2017

(51) Int. Cl.
| | |
|---|---|
| *F23R 3/28* | (2006.01) |
| *F23R 3/34* | (2006.01) |
| *F23R 3/40* | (2006.01) |
| *F02C 7/264* | (2006.01) |
| *F23C 13/00* | (2006.01) |
| *F23Q 11/00* | (2006.01) |
| *F23Q 11/04* | (2006.01) |

(52) U.S. Cl.
CPC ............... *F23R 3/40* (2013.01); *F02C 7/264* (2013.01); *F23C 13/00* (2013.01); *F23Q 11/00* (2013.01); *F23Q 11/04* (2013.01); *F23R 3/28* (2013.01); *F23R 3/34* (2013.01); *F23R 3/343* (2013.01)

(58) Field of Classification Search
CPC .... F23R 3/40; F23R 3/34; F23R 3/343; F23R 3/28; F23C 13/00; F23Q 11/00; F23Q 11/04; F02C 7/264
See application file for complete search history.

(56) References Cited

U.S. PATENT DOCUMENTS

| | | | |
|---|---|---|---|
| 2,970,439 A | 2/1961 | Berl | |
| 3,681,002 A | 8/1972 | Weller et al. | |
| 4,455,822 A | 6/1984 | Bayle-Laboure et al. | |
| 5,531,066 A | 7/1996 | Pfefferle et al. | |
| 5,577,906 A * | 11/1996 | Hanakata | B01J 23/44 431/11 |
| 5,636,511 A | 6/1997 | Pfefferle et al. | |
| 5,720,163 A | 2/1998 | Pfefferle et al. | |
| 7,117,674 B2 * | 10/2006 | Sprouse | F23C 13/02 60/723 |

(Continued)

FOREIGN PATENT DOCUMENTS

| | | |
|---|---|---|
| DE | 2708940 A1 | 9/1977 |
| GB | 1578665 A | 11/1980 |
| JP | S57153929 A | 9/1982 |

OTHER PUBLICATIONS

Invitation to Pay Additional Fees issued in connection with corresponding PCT Application No. PCT/US2017/013487 on Apr. 18, 2017.

*Primary Examiner* — Steven M Sutherland
*Assistant Examiner* — Thuyhang N Nguyen
(74) *Attorney, Agent, or Firm* — Frank A. Landgraff

(57) ABSTRACT

A catalytic ignition system includes a gas fuel supply and a catalytic igniter that is in fluid communication with the gas fuel supply. The catalytic igniter comprises a metallic shell, a catalyst disposed within the metallic shell and a fuel tube that is oriented so as to direct a flow of gas fuel from the gas fuel supply across the catalyst and towards a downstream end of the metallic shell.

20 Claims, 4 Drawing Sheets

(56) References Cited

U.S. PATENT DOCUMENTS

| | | | | |
|---|---|---|---|---|
| 7,278,265 B2* | 10/2007 | Alvin | ............... | F23C 13/00 |
| | | | | 106/287.17 |
| 7,981,831 B2* | 7/2011 | Yang | ............... | B01D 53/864 |
| | | | | 420/436 |
| 2006/0080967 A1* | 4/2006 | Colket, III | ............... | F23C 6/045 |
| | | | | 60/777 |
| 2009/0094984 A1* | 4/2009 | Colket | ............... | F02C 7/22 |
| | | | | 60/723 |
| 2011/0056184 A1 | 3/2011 | Sisco et al. | | |

* cited by examiner

CATALYTIC IGNITION SYSTEM

FIELD OF THE DISCLOSURE

The present disclosure relates to a catalytic ignition system for combustion related systems of a gas turbine combustor.

BACKGROUND OF THE DISCLOSURE

Current ignition systems for lighting off a fuel within a gas turbine combustion system such as in a combustion test stand or a gas turbine combustor require an energy source such as a spark igniter to produce a plasma spark. The plasma spark may be used to light off a torch inside the combustion system which in turn ignites the fuel. Spark igniters for these combustion systems are generally bulky and as such may be impractical for use in certain locations within the combustion system due to geometrical mounting limitations.

BRIEF DESCRIPTION OF THE DISCLOSURE

Aspects and advantages of the disclosure are set forth below in the following description, or may be obvious from the description, or may be learned through practice of the disclosure.

One embodiment of the present disclosure is a catalytic ignition system. The catalytic combustion system includes a gas fuel supply and a catalytic igniter that is in fluid communication with the gas fuel supply. The catalytic igniter comprises a metallic shell, a catalyst disposed within the metallic shell and a fuel tube. The fuel tube is oriented to direct a flow of gas fuel from the gas fuel supply from an upstream end of the metallic shell, across the catalyst and towards a downstream end of the metallic shell. The gas fuel and catalyst react with ambient air to cause auto-ignition of the gas fuel.

Another embodiment of the present disclosure is a combustion system. The combustion system includes a combustor having a fuel nozzle in fluid communication with a fuel supply and a combustion zone defined downstream from the fuel nozzle. The combustion system also includes a catalytic ignition system. The catalytic ignition system comprises a gas fuel supply and one or more catalytic igniters in fluid communication with the gas fuel supply and disposed within the combustor proximate to the combustion chamber. Each catalytic igniter includes a metallic shell, a catalyst disposed within the metallic shell and a fuel tube. The fuel tube is oriented to direct a flow of gas fuel from the gas fuel supply across the catalyst and towards the combustion zone. The gas fuel and catalyst react with ambient air within the combustor to cause auto-ignition of the gas fuel.

Those of ordinary skill in the art will better appreciate the features and aspects of such embodiments, and others, upon review of the specification.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

DETAILED DESCRIPTION OF THE DISCLOSURE

Figure 1:
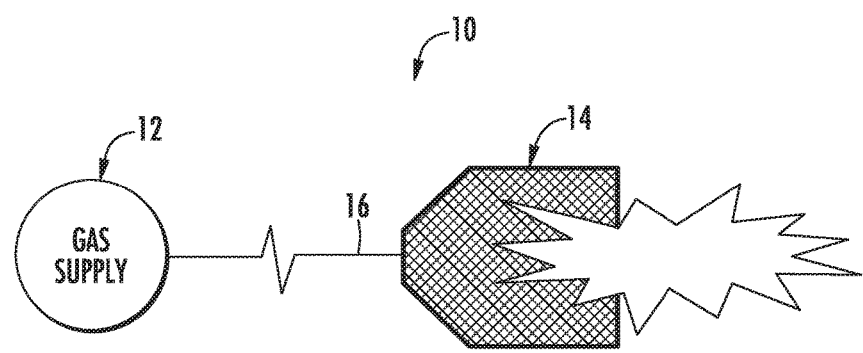
FIG. 1 is a schematic diagram of an exemplary catalytic ignition system according to at least one embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The terms "upstream," "downstream," refer to the relative direction with respect to fluid flow in a fluid pathway. For example, "upstream" refers to the direction from which the fluid flows, and "downstream" refers to the direction to which the fluid flows. The term "radially" refers to the relative direction substantially perpendicular to a centerline of a component and "axially" refers to the relative direction substantially parallel to the centerline.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Figure 2:
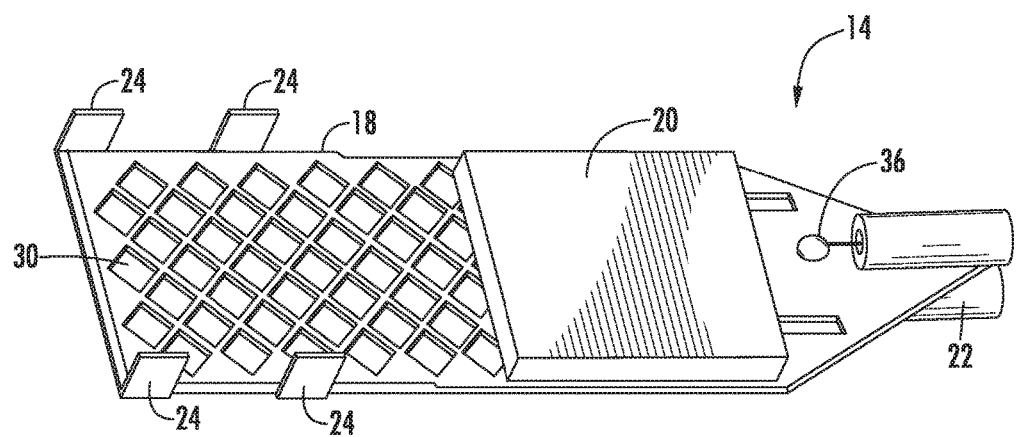
FIG. 2 is a perspective view an exemplary catalytic igniter according to at least one embodiment of the present disclosure.
Figure 3:
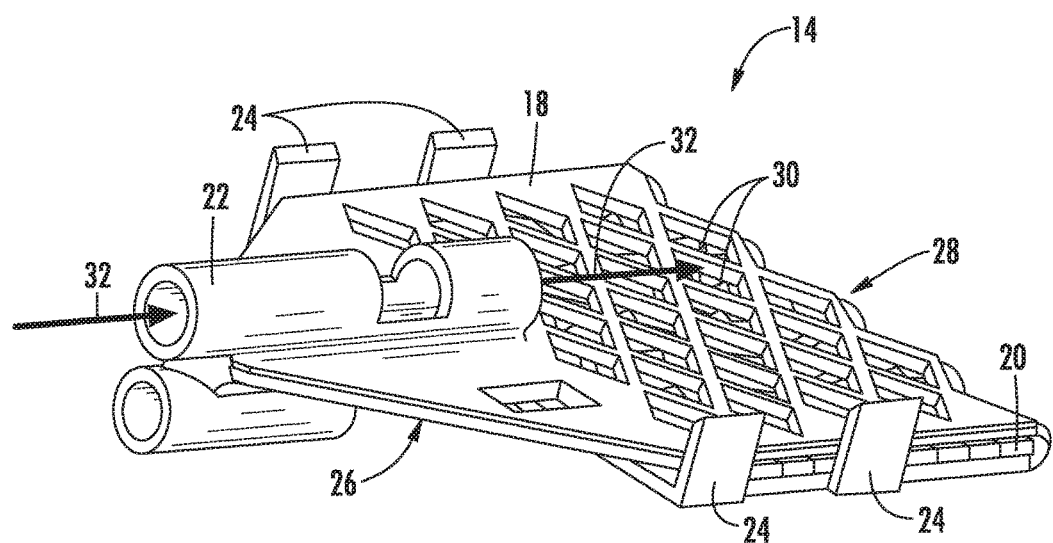
FIG. 3 is a perspective downstream view of the catalytic igniter as shown in FIG. 2, according to at least one embodiment of the present disclosure.

Referring now to the drawings, wherein identical numerals indicate the same elements throughout the figures, FIG. 1 provides a catalytic ignition system 10 according to at least one embodiment of the present disclosure. As shown in FIG. 1, the catalytic ignition system 10 includes a gas fuel supply 12 and a catalytic igniter 14 which is in fluid communication with the gas fuel supply 12 via one or more gas supply lines or conduits 16. FIG. 2 provides a perspective view of a partially assembled exemplary catalytic igniter 14 according to one embodiment of the present disclosure. FIG. 3 provides a downstream fuel side perspective view of the catalytic igniter 14 as shown in FIG. 2 assembled according to one embodiment of the present disclosure.

As shown in FIGS. 2 and 3, the catalytic igniter 14 includes a metallic shell 18, a catalyst 20 disposed within the metallic shell 18 and a fuel tube or fuel tube support 22. In one embodiment, the metallic shell 18 may be formed from a sheet metal, additively manufacture sheet metal, wire or from any other material suitable to withstand operating temperatures and operating environment within a combustion system such as a gas turbine combustion system. In particular embodiments, the metallic shell 18 includes one or more snaps or tabs 24 for locking or securing the catalyst 20 within the metallic shell 18.

As shown in FIG. 3, the metallic shell 18 includes an upstream end portion 26 and a downstream end portion 28. In particular embodiments, the metallic shell 18 has generally diamond shaped mesh openings 30. The shape of the mesh openings 30 is not limited to diamond shapes unless otherwise specified in the claims. For example, the mesh openings 30 may be circular, triangular or oval or may have multiple shapes.

As shown in FIG. 3, the fuel tube 22 may be oriented in such a manner so as to direct a flow of gas fuel, as indicated by arrows 32, across one or more sides of the catalyst 20. In one embodiment, the fuel tube 22 may be connected to the upstream end portion 26 of the metallic shell 18. The gas fuel 32 may comprise hydrogen gas ($H_2$), methane ($CH_4$), propane ($C_3H_8$), ethane ($C_2H_6$) or other suitable alkane or other suitable combustible gases. In one embodiment, the gas fuel comprises hydrogen gas.

Figure 4:
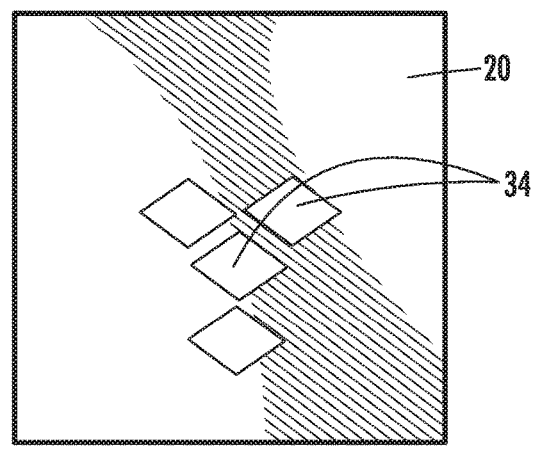
FIG. 4 is a side view of an exemplary catalyst according to at least one embodiment of the present disclosure.

The catalyst 20 may comprise of any catalyst suitable for reacting with the gas fuel and ambient air present within a combustion system so as to generate heat or thermal release sufficient to cause auto-ignition of the gas fuel. For example, in particular embodiments, the catalyst comprises ceramic fibers impregnated with platinum (Pt). In particular embodiments, as illustrated in FIG. 4, the catalyst 20 includes one or more voids 34 defined along a surface or side of the catalyst 20. The one or more voids 34 define low velocity gas recirculation zones across the catalyst 20. The void(s) 34 may be defined along any side of the catalyst 20. In one embodiment, at least one void 34 is defined on a side of the catalyst 20 that is in direct fluid communication with the flow of gas fuel 32.

In particular embodiments, as shown in FIG. 2, the catalytic igniter 14 further includes a thermocouple 36 coupled to the metallic shell 18 or otherwise mounted to the catalytic igniter 14. The thermocouple 36 may be used to measure one or more of temperature of the catalyst 20, the temperature of metallic shell 18 and/or to indicate ignition of the gas fuel 32.

Figure 5:
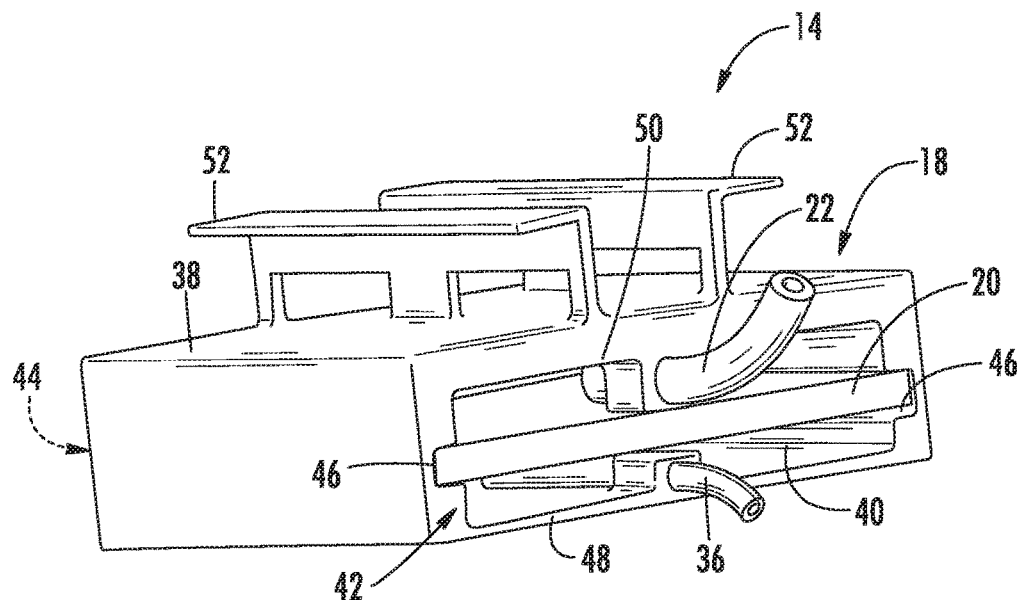
FIG. 5 is a perspective downstream view of an exemplary catalytic igniter according to at least one embodiment of the present disclosure.
Figure 6:
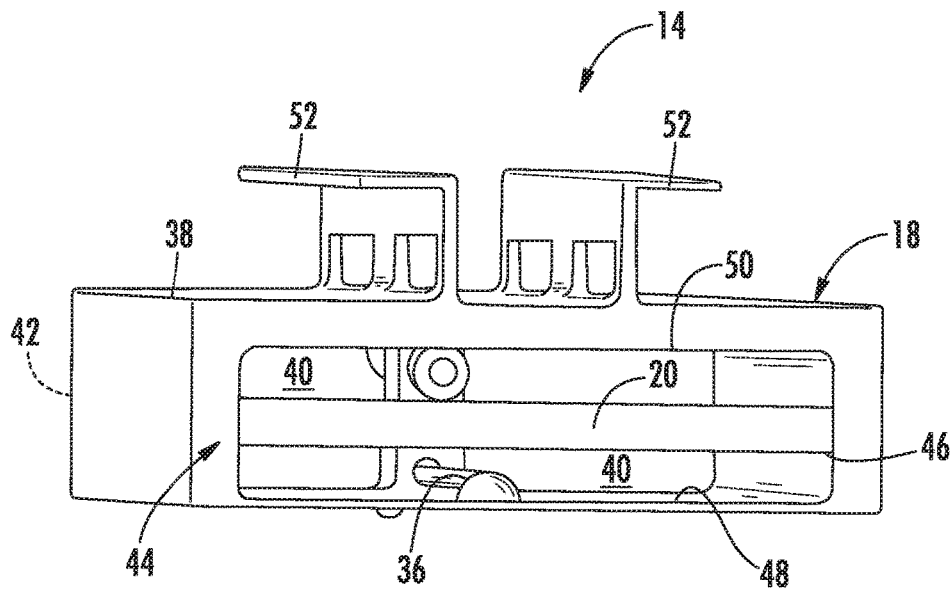
FIG. 6 is a perspective upstream view of the catalytic igniter as shown in FIG. 5, according to at least one embodiment of the present disclosure.

FIG. 5 provides an upstream perspective view of the catalytic igniter 14 and FIG. 6 provides a downstream perspective view of the catalytic igniter 14 according to another embodiment. As shown in FIGS. 5 and 6, the metallic sleeve 18 may comprise a flow or torch sleeve 38. As shown, the catalyst 20 may be disposed within a flow passage 40 that is at least partially defined by the flow or torch sleeve 38. The flow sleeve 38 generally includes an upstream end 42 axially spaced from a downstream end 44. The flow sleeve 38 may include one or more slots 46 for supporting for mounting the catalyst 20 therein. As shown in FIGS. 5 and 6, the catalyst 20 may be position within the flow passage 40 equidistance from an inner wall 48 and an outer wall 50 of the flow sleeve 38, thereby allowing for ambient air to flow across at least two sides of the catalyst 20.

In particular embodiments, the fuel tube 22 may be mounted to the upstream end 42 of the flow sleeve 38. In particular embodiments, the thermocouple 36 may be coupled to a wall of the flow sleeve. For example, in one embodiment, the thermocouple is attached to the inner wall 48 of the flow sleeve 38. In particular embodiments, the flow sleeve 38 may include one or more brackets 52 for mounting the catalytic igniter 14 to various surfaces such as a liner or flow sleeve of a gas turbine combustion system.

Figure 7:
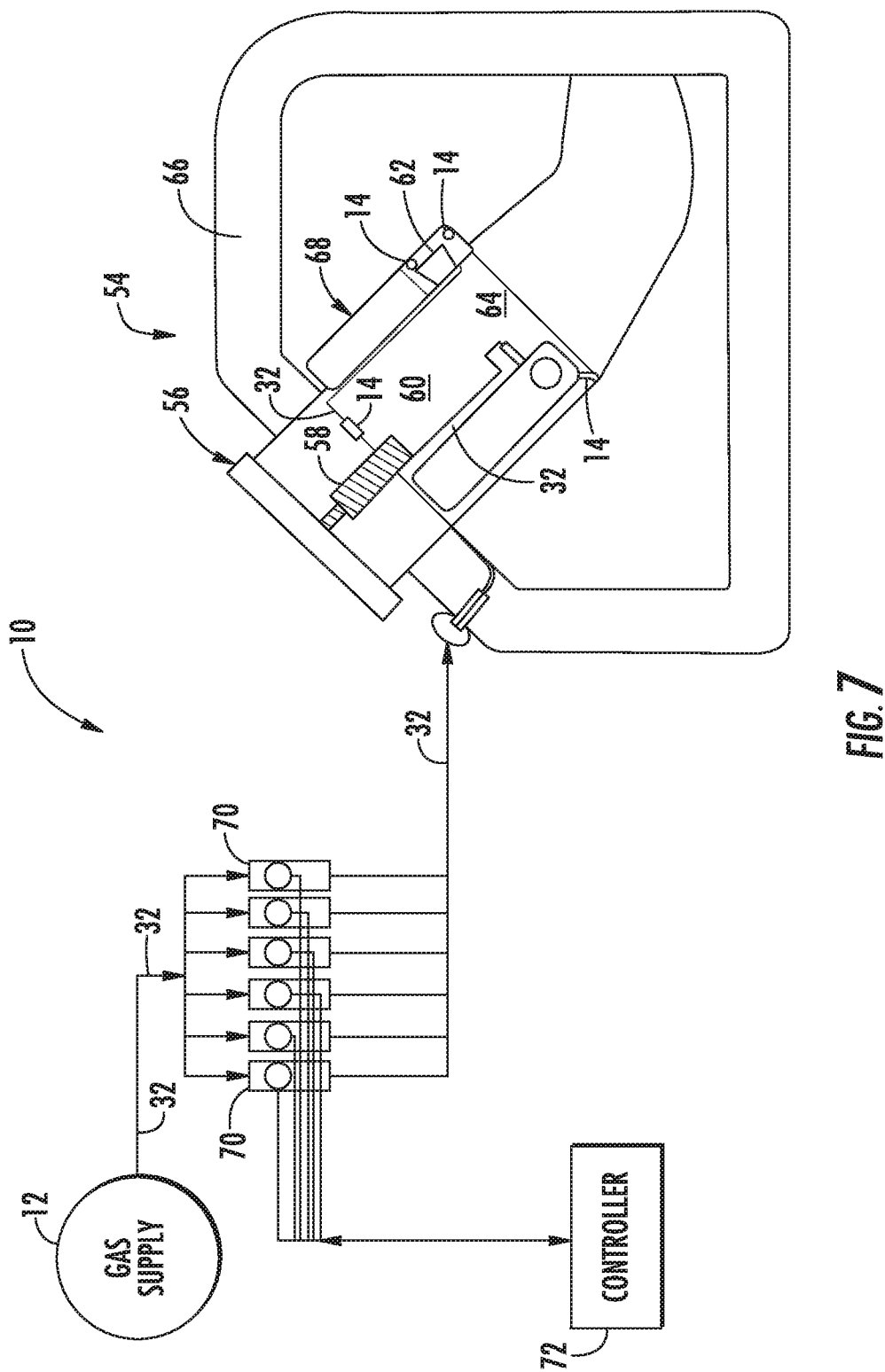
FIG. 7 is a schematic view of a catalytic ignition system deployed in an exemplary combustion system according to one embodiment of the present disclosure.

The catalytic ignition system 10 may be incorporated into any combustion system. FIG. 7 provides a schematic diagram of the catalytic ignition system 10 deployed on a combustion system 54 for a gas turbine according to one embodiment. As shown in FIG. 7, the combustion system 54 includes at least one combustor 56. The combustor 56 includes at least one fuel nozzle 58 that is in fluid communication with a fuel supply (not shown) and a combustion or reaction zone 60 defined downstream from the fuel nozzle(s) 58. In particular configurations, the combustor 56 may include one or more fuel injectors 62 disposed downstream from the fuel nozzle(s) 58. The fuel injector(s) 62 generally feed a fuel and air mixture to a secondary combustion or reaction zone 64 defined downstream from combustion zone 60. One or more of the catalytic igniters 14 in fluid communication with the gas fuel supply 12 may be positioned within an outer casing 66 and/or a flow sleeve or liner 68 of the combustor 56 proximate to one or more of the fuel nozzle(s) 58, the combustion zone 60, the fuel injector(s) 62 and/or the secondary combustion zone 64.

As shown in FIG. 7, the catalytic combustion system 10 may include one or more flow regulators 70 to control the flow to the catalytic igniter(s) 14. In particular embodiments, the catalytic combustion system 10 may include a controller 72. The controller 72 may be electronically connected to one or more of the regulator(s) 70, the gas fuel supply 12 and/or the thermocouple(s) 36 and may be programed to control flow of the gas fuel to the catalytic igniter(s) 14 via the regulator(s) 70 and/or detect auto-ignition of the gas fuel 32 at the catalytic igniter 14.

In operation, gas fuel 32 flows from the gas fuel supply 12 to one or more of the catalytic igniters 14. As the gas fuel 32 flows downstream from the fuel tube 22 and across the catalyst 20 it reacts with ambient air 74 provided to the combustor 56 via a compressor or other supply source, thereby creating a region of reactivity on the surface of the catalyst 20 which facilitates the chemical reaction and thermal release. The thermal release raises the temperature of the catalyst to a temperature which is sufficient to cause auto-ignition of the gas fuel 32, thereby creating a typical flame structure which will form at an exit of the fuel tube 22 and extend downstream until the gas fuel 32 fuel is consumed. The flame created by the auto-ignition may then be used to light off the fuel nozzle(s) 58 and/or the fuel injector(s) 62. The flow of gas fuel 32 may be shut off once combustion within the combustion zones (60), (64) is stable.

The gas fuel 32 is flammable only between the rich and lean limits. The various embodiments of the catalytic igniter provided herein produce three fuel concentration regions across the catalytic igniter 14: a fuel rich region, a mixed region and a lean region by directing the gas fuel 32 over the generally flat catalyst 20. In this manner, the rich and lean regions remain relatively cool and enable the catalyst 20 and metallic shell 18 to remain at or below their respective melting temperatures.

This written description, which includes the best mode, uses examples to disclose the disclosure and to enable any person skilled in the art to practice the disclosure, including making and using any devices or systems and performing any incorporated methods. The patentable scope of the disclosure is defined by the claims, and may include other examples that occur to those skilled in the art. Such other examples are intended to fall within the scope of the claims if they include structural elements that do not differ from the literal language of the claims, or if they include equivalent structural elements with insubstantial differences from the literal language of the claims.

What is claimed is:

1. A catalytic ignition system, comprising:
   a gas fuel supply; and
   a catalytic igniter comprising a fuel tube in fluid communication with the gas fuel supply;
   a catalyst panel having a planar surface and including one or more voids defined along the planar surface of the catalyst panel; and
   a metallic shell comprising a first planar segment and a second planar segment, the first planar segment and the second planar segment being disposed on opposite sides of the catalyst panel;
   wherein at least one of the first planar segment and the second planar segment of the metallic shell comprises a plurality of mesh openings;
   wherein the fuel tube is oriented to direct a flow of gas fuel from the gas fuel supply from an upstream end of the metallic shell, across the catalyst panel and the plurality of mesh openings, and towards a downstream end of the metallic shell, whereby a fuel rich region, a mixed region, and a lean region are formed over the catalyst panel;
   wherein the gas fuel and the catalyst panel react with ambient air to cause auto-ignition of the flow of gas fuel; and
   wherein the one or more voids are defined on a side of the catalyst panel that is in direct fluid communication with the flow of gas fuel.

2. The catalytic ignition system as in claim 1, wherein the plurality of mesh openings being aligned with the one or more voids on the planar surface of the catalyst panel; and
   wherein the metallic shell comprises a third planar segment extending radially between the first planar segment and the second planar segment, such that the metallic shell is wrapped around the catalyst panel on three sides of the catalyst panel.

3. The catalytic ignition system as in claim 1, wherein the one or more voids define low velocity gas recirculation zones across the catalyst panel.

4. The catalytic ignition system as in claim 1, wherein the catalyst panel comprises ceramic fibers impregnated with platinum.

5. The catalytic ignition system as in claim 1, wherein the flow of gas fuel comprises one of hydrogen gas ($H_2$), methane ($CH_4$), propane ($C_3H_8$), and ethane ($C_2H_6$).

6. The catalytic ignition system as in claim 1, wherein the catalytic igniter further includes a thermocouple coupled to the upstream end of the metallic shell.

7. The catalytic ignition system as in claim 1, wherein the first planar segment and the second planar segment of the metallic shell partially define a flow sleeve having a flow passage therethrough; and wherein the catalyst panel is disposed within the flow passage.

8. The catalytic ignition system as in claim 7, wherein the fuel tube is mounted to an upstream end of the flow sleeve.

9. The catalytic ignition system as in claim 7, further comprising a thermocouple coupled to a radially inner wall of the flow sleeve.

10. The catalytic ignition system as in claim 7, wherein the catalyst panel is mounted in the flow passage via one or more slots defined in one or more side walls of the flow sleeve; and wherein the one or more side walls extend radially between the first planar segment and the second planar segment.

11. A combustion system, comprising:
    a combustor including a fuel nozzle in fluid communication with a fuel supply and a combustion zone defined downstream from the fuel nozzle; and
    a catalytic ignition system, the catalytic ignition system comprising:
    a gas fuel supply; and
    one or more catalytic igniters in fluid communication with the gas fuel supply and disposed within the combustor proximate to the combustion zone, each catalytic igniter comprising:
       a metallic shell having a first planar segment and a second planar segment disposed opposite the first planar segment;
       a catalyst panel disposed between the first planar segment and the second planar segment of the metallic shell, the catalyst panel having a planar surface and including one or more voids defined along the planar surface of the catalyst panel; and
       a fuel tube in fluid communication with the gas fuel supply;
    wherein at least one of the first planar segment and the second planar segment of the metallic shell comprises a plurality of mesh openings;
    wherein the fuel tube is oriented to direct a flow of gas fuel from the gas fuel supply across the catalyst panel and the plurality of mesh openings towards the combustion zone, whereby a fuel rich region, a mixed region and a lean region are formed over the catalyst panel;
    wherein the flow of gas fuel and the catalyst panel react with ambient air within the combustor to cause auto-ignition of the flow of gas fuel; and
    wherein the one or more voids are defined on a side of the catalyst panel that is in direct fluid communication with the flow of gas fuel.

12. The combustion system as in claim 11, wherein the plurality of mesh openings being aligned with the one or more voids on the planar surface of the catalyst panel; and
    wherein the metallic shell comprises a third planar segment extending radially between the first planar segment and the third planar segment, such that the metallic shell is wrapped around the catalyst panel on three sides of the catalyst panel.

13. The combustion system as in claim 11, wherein the one or more voids define low velocity gas fuel recirculation zones across the catalyst panel.

14. The combustion system as in claim 11, wherein the catalyst panel comprises ceramic fibers impregnated with platinum.

15. The combustion system as in claim 11, wherein the flow of gas fuel comprises one of hydrogen gas ($H_2$), methane ($CH_4$), propane ($C_3H_8$), and ethane ($C_2H_6$).

16. The combustion system as in claim 11, wherein each catalytic igniter further includes a thermocouple coupled to the upstream end of the metallic shell.

17. The combustion system as in claim 11, wherein the first planar segment and the second planar segment of the metallic shell partially define a flow sleeve having a flow passage therethrough; and wherein the catalyst panel is disposed within the flow passage.

18. The combustion system as in claim 17, wherein the fuel tube is mounted to an upstream end of the flow sleeve.

19. The combustion system as in claim 17, further comprising a thermocouple coupled a radially inner wall of the flow sleeve.

20. The combustion system as in claim 17, wherein each catalyst panel of the at least one catalytic igniter is mounted in the flow passage via one or more slots defined in one or more side walls of the flow sleeve; and wherein the one or more side walls extend radially between the first planar segment and the second planar segment.

* * * * *